July 28, 1936.  W. A. WALSLEBEN  2,049,184

CONDUIT

Filed Aug. 21, 1934

INVENTOR
W. A. WALSLEBEN
BY
E. R. Nowlan
ATTORNEY

Patented July 28, 1936

2,049,184

UNITED STATES PATENT OFFICE 2,049,184

CONDUIT

William A. Walsleben, Hempstead, N. Y., assignor to Western Electric Company, Incorporated, New York, N. Y., a corporation of New York Application August 21, 1934, Serial No. 740,730

5 Claims. (Cl. 247—37)

This invention relates to conduits and more particularly to conduits such as are used for the installation of electrical conductors.

Installations of telephones, fans, electrical refrigerators and other comparable apparatus in offices and for domestic uses are often of a semi-permanent nature, being for example permanent through a lease tenancy of the premises but not intended to last through the lift of the building. Hence such apparatus and especially the electrical conductors which serve them must be installed so as to be protected safely and yet easily removable. Furthermore, and particularly in the case of the conductors, these installations must be so arranged as to be sightly, unobtrusive and not liable either to be damaged or to cause damage or annoyance. It is also important that means be provided whereby the conduit may be conveniently opened after installation to permit of additions to or subtractions from the number of conductors contained therein without liability of damage to the conductors.

An object of the present invention is to provide a conduit for the housing of electrical conductors on floors particularly but also on other surfaces which shall be simple and easy to manufacture and to install, unobtrusive and sightly in use, shall afford complete protection to conductors housed therein and shall present no abruptnesses of contour apt to cause tripping thereover or to interfere with the moving of furniture and the like or with housecleaning operations.

With this and other objects in view a preferred form of the invention contemplates a conduit comprising three principal generally channel shaped members, two of which, one within the other, face upwards, and the third faces downward with its downwardly extending sides interposed between and frictionally held by the upwardly extending sides of the first two, the sides of the outermost upwardly facing member being extended, everted and bent down to form gently sloping ramps. If desired, screws or other means may be provided to fasten the whole to a supporting surface, the heads of the screws being hidden within the structure.

Figure 1:
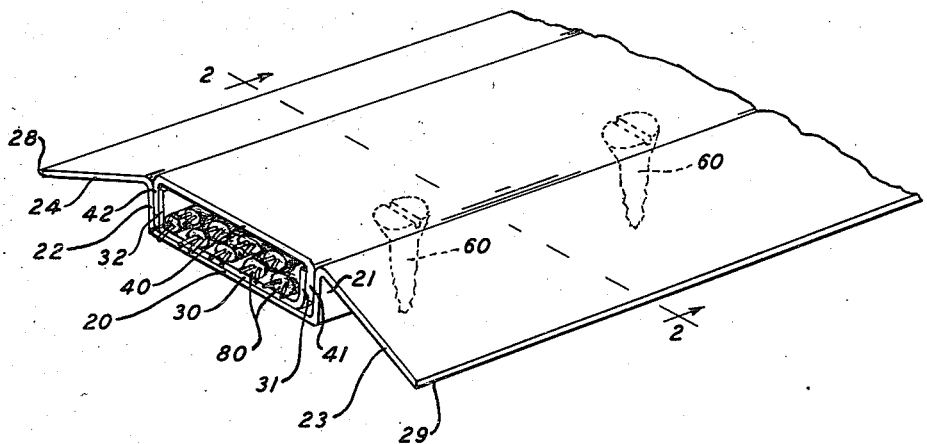
Figure 2:
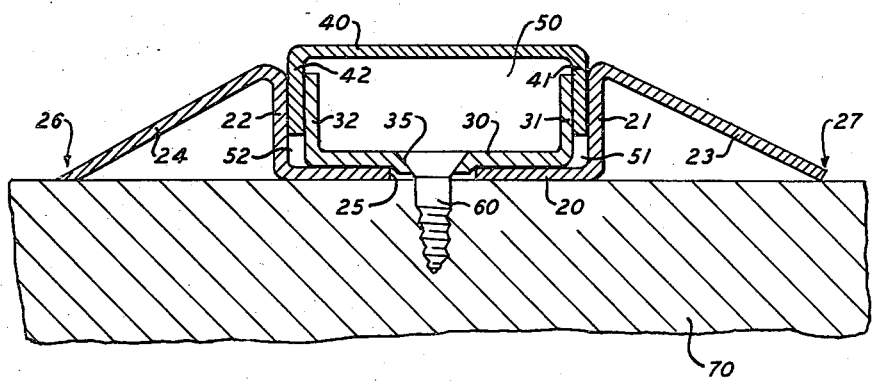
Figure 3:
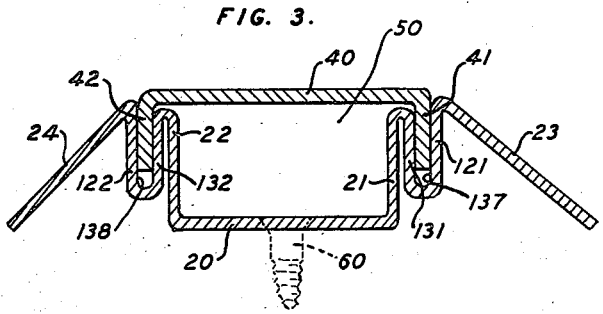

Other objects and characteristic features of the invention will appear from the following detailed description of one embodiment thereof taken in connection with the accompanying drawing in which like reference numerals are appended to identical parts in the several figures and in which Fig. 1 is a broken view in perspective of one end of a section of conduit constructed in accordance with the invention, and with conductors positioned therein;

Fig. 2 is a sectional view on the line 2—2 of Fig. 1 with the conductors omitted, and Fig. 3 is a similar view of a modified form.

In the embodiment of the invention disclosed in Figs. 1 and 2, the conduit comprises three principal generally channel shaped metal members 20, 30 and 40. The base member 20 has a flat horizontal central floor portion turned up along each side to form upstanding side walls 21 and 22. The side walls are formed with integral outwardly and downwardly extending ramps 23 and 24.

The liner member 30 is a plain channel member having a flat floor and integral upturned side walls 31 and 32, and the roof member 40 is also a plain channel member having a flat central roof portion and integral downwardly depending side walls 41 and 42.

The liner member 30 is positioned within the channel part of the base member 20 with the floor of the liner resting on the floor of the base and the walls 31 and 32 of the liner extending up parallel to and respectively equidistantly spaced from the corresponding side walls 21 and 22 of the base.

The roof member 40 is positioned with its depending side walls 41 and 42 extending down between the upstanding side walls of the liner and base, the wall 42 coming between the walls 22 and 32 and the wall 41 between the walls 21 and 31.

The floor of the liner is perforated at intervals along its central line with holes 35 having chamfered or peripherally depressed edges for the reception of the correspondingly conical heads of attaching screws 60 driven into a floor or wall or the like 70, the heads of the screws being thus countersunk flush with the floor of the space 50. The screws pass through corresponding somewhat enlarged apertures 25 in the floor of the base.

The several parts are preferably so proportioned that the walls of the roof are respectively frictionally gripped and held between the corresponding walls of the liner and base. Thus the space 50 inside is thoroughly protected. Dust, water or other foreign matter entering fortuitously is trapped in the spaces 51 and 52, and water will be drained off through the screw clearance holes 25 in the floor of the base.

Preferably the base 20 is so formed that the lateral extremities 29 and 28 of the ramps 23 and 24 extend somewhat below the plane of the bottom of the base. Thus, when the base is fastended down on a floor or other surface, the edges 29 and 28 are forced into close contact with the surface.

In installing the conduit, the base member 20 is first laid in place and the liner 30 positioned therein. The screws 60 are then driven which locks the two members in position on the supporting surface and also relatively to each other. Insulated conductors 80 may then be laid in the trough of the member 30. The roof member is then forced into position.

In assembling or installing conduits of this general nature with conductors therein, it is important that there be no opportunity for nipping, shearing or otherwise damaging the conductors as the parts of the conduit are fitted or forced together. In the structures herein disclosed it will be apparent that this danger is minimized by the fact that the walls 41 and 42 are received between the stationary walls 21 and 31 and 22 and 32 respectively, as the member 40 is forced into place rendering it impossible for the edges of the walls 41 and 42 to damage conductors located in the space 50.

When the conduit is installed on a floor, the ramps 23 and 24 prevent tripping over the conduit and also permit furniture and the like to be easily pushed over it. If the conduit is made large and of relatively thick material the outer edge of the ramp may be chamfered as at 26 (Fig. 2) to obviate any abruptly upstanding surface, but if the material be thin and light this edge may be left square as shown at 27 (Fig. 2).

In the embodiment disclosed above the three members are thought of as continuous and of equal length with each other, but either the member 20 or the member 30 may be made discontinuous so as to comprise a sequence of short lengths.

Fig. 3 discloses an alternative form of the invention embodied in two principal members instead of three. Here the member 20 has its side walls folded twice between the upstanding inner walls 21 and 22 and the ramps 23 and 24 to form vertically disposed grooves 137 and 138 between walls 121 and 131 and between walls 122 and 132 respectively to receive the side walls 41 and 42 of the roof member 40, thus dispensing with the need for a separate liner member 30 while still sheathing the side walls of the roof member in spaces separated from the conductor space 50.

Thus in either construction disclosed the base unit comprising members 20 and 30 in Figs. 1 and 2 or only member 20 in Fig. 3 presents a conductor receiving space which is separate from the spaces adapted to receive the side walls of the roof member 40. Furthermore the embodiment disclosed in Figs. 1 and 2 may be considered as consisting of a conduit unit proper and a base unit, the conduit unit whose primary function is to enclose and protect the conductors housed therein, comprising the roof member 40 and the liner member 30, while the base unit whose primary function is to hold the conduit unit proper in place and to protect the same against disturbance and against being an obstacle, comprises the base member 20 and its ramps.

The embodiments of the invention herein disclosed are merely illustrative and may be modified and departed from in many ways without departing from the spirit and scope of the invention as pointed out in and limited only by the appended claims.

What is claimed is:

1. A conduit for housing conductors comprising a base member having a floor and side walls integral therewith and upstanding therefrom and ramp members integral with the side walls and extending outwardly and downwardly therefrom, a liner member positioned within the base member and having upstanding side walls integral therewith and parallel to and respectively spaced from the side walls of the base member, and a roof member having depending side walls respectively positioned between a side wall of the base member and a side wall of the liner member.

2. A conduit for housing conductors comprising a generally channel shaped base member having a flat floor portion and integral side walls upstanding therefrom and integral ramp portions extending outwardly and downwardly therefrom, a generally channel shaped liner member having a flat floor portion and integral sidewalls upstanding therefrom and the liner member being positioned within the base member with its floor portion resting on the floor portion of the base member and the side walls of the liner member parallel to and spaced from the corresponding side walls of the base member, and a generally channel shaped roof member having a flat main portion and integral side walls depending therefrom, the side walls of the roof member being respectively positioned between a side wall of the liner member and a side wall of the base member.

3. In a conduit assembly for housing conductors and to be installed on a substantially plane supporting surface, the combination with a substantially tubular conduit proper of a base member therefor provided with a main portion having a channel recess therein to receive and hold the conduit proper and having lateral ramp members to facilitate passage of objects over the assembly.

4. In a conduit assembly for housing conductors and to be installed on a substantially plane supporting surface, the combination with a base member having a central main portion formed with a channel recess and the base member being formed with lateral ramps to facilitate passage of objects over the assembly, of a substantially tubular conduit member embedded in the channel recess.

5. In a conduit assembly for housing conductors and to be installed on a substantially plane supporting surface, the combination with a base member having a central main portion formed with a channel recess and the base member being formed with lateral ramps to facilitate passage of objects over the assembly, of a substantially tubular conduit member embedded in the channel recess and comprising a pair of channel shaped units telescoped the one into the other.

WILLIAM A. WALSLEBEN.